US006381741B1

(12) United States Patent
Shaw

(10) Patent No.: US 6,381,741 B1
(45) Date of Patent: *Apr. 30, 2002

(54) SECURE DATA DOWNLOADING, RECOVERY AND UPGRADING

(75) Inventor: Robert Shaw, Los Altos, CA (US)

(73) Assignee: Liberate Technologies, San Carlos, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,577

(22) Filed: May 18, 1998

(51) Int. Cl.$^7$ ................................................ G06F 9/45
(52) U.S. Cl. ............................................. 717/11; 717/1
(58) Field of Search ........................... 395/712; 717/1, 717/11

(56) References Cited

U.S. PATENT DOCUMENTS

| | | | |
|---|---|---|---|
| 4,888,801 A | | 12/1989 | Foster et al. |
| 5,155,847 A | * | 10/1992 | Kirouac et al. ............. 395/600 |
| 5,224,163 A | | 6/1993 | Gasser et al. |
| 5,373,561 A | | 12/1994 | Haber et al. ................... 380/49 |
| 5,444,861 A | * | 8/1995 | Adamec et al. ............. 395/700 |
| 5,453,779 A | | 9/1995 | Dan et al. ....................... 348/7 |
| 5,481,294 A | | 1/1996 | Thomas et al. |
| 5,495,610 A | * | 2/1996 | Shing et al. ................. 395/600 |
| 5,497,422 A | | 3/1996 | Tysen et al. ................... 380/25 |
| 5,541,638 A | | 7/1996 | Story ............................. 348/7 |
| 5,553,123 A | | 9/1996 | Chan et al. |
| 5,600,364 A | | 2/1997 | Hendricks et al. ............. 348/1 |
| 5,634,051 A | | 5/1997 | Thomson ....................... 707/5 |
| 5,680,458 A | | 10/1997 | Spelman et al. |
| 5,708,845 A | | 1/1998 | Wistendahl et al. ........ 345/302 |
| 5,727,129 A | | 3/1998 | Barrett et al. .......... 395/200.47 |

(List continued on next page.)

OTHER PUBLICATIONS

Frieder et al. Dynamically Updating Distributed Software: Supporting Change in Uncertain and Mistrustful Environments. IEEE. pp. 254–261. Jan. 1989.*

Hauptmann et al. On–line Maintenance with On–the–fly Software Replacement. IEEE. pp. 70–80. Aug. 1996.*

Bussey H E Et Al: "Service Architecture, Prototype Description, And Network Implications Of A Personalized Information Grazing Service" Multiple Facets Of Integration,San Francisco,Jun. 3–7, 1990 Institute Of Electrical And Electronic Engineers, pp. 1046–1053, XP000164339 see whole document.

Wyle M F: "A Wide Area Network Information Filter" Proceedings International Conference Artificial Intelligence On Wall Street, Oct. 9, 1991, pp. 10–15, XP000534152 see the whole document.

Lang K: "NewsWeeder: learning to filter netnews" Machine Learning. Proceedings Of The Twelfth International Conference On Machine Learning, Tahoe City, CA, USA, Jul. 9–12, 1995, San Francisco, CA, USA, Morgan Kaufmann Publishers, USA, pp. 331–339, XP002046557 see the whole document.

(List continued on next page.)

Primary Examiner—Tuan Q. Dam
Assistant Examiner—Wei Zhen
(74) Attorney, Agent, or Firm—Michael A. Glenn

(57) ABSTRACT

The invention provides an improved method and system for secure down-loading, recovery, and upgrading of data. A client device receives information from a server device using a reliable software modules stored in permanent memory in the client device. The reliable software modules perform software and data integrity tests, and locate and retrieve data for recovery or upgrade of the client device. The client device confirms the trustworthiness of the received information device by comparing digital signatures or digests for the information it receives with known digital certificates in the reliable software module.

17 Claims, 3 Drawing Sheets

U.S. PATENT DOCUMENTS

| | | | |
|---|---|---|---|
| 5,745,574 A | | 4/1998 | Muftic |
| 5,752,042 A | * | 5/1998 | Cole et al. ................... 395/712 |
| 5,754,938 A | | 5/1998 | Herz et al. ............. 395/200.49 |
| 5,754,939 A | | 5/1998 | Herz et al. ............. 395/200.49 |
| 5,757,920 A | | 5/1998 | Misra et al. |
| 5,761,306 A | | 6/1998 | Lewis ......................... 380/21 |
| 5,764,992 A | * | 6/1998 | Kullick et al. ............. 395/712 |
| 5,768,389 A | | 6/1998 | Ishii |
| 5,774,540 A | | 6/1998 | Davidson et al. |
| 5,787,172 A | | 7/1998 | Arnold ........................ 380/21 |
| 5,790,796 A | | 8/1998 | Sadowsky |
| 5,796,840 A | | 8/1998 | Davis ......................... 380/50 |
| 5,796,841 A | | 8/1998 | Cordery et al. |
| 5,809,287 A | * | 9/1998 | Stupek, Jr. et al. ......... 395/500 |
| 5,850,232 A | | 12/1998 | Engstrom et al. ........... 345/511 |
| 5,852,665 A | | 12/1998 | Gresser et al. |
| 5,859,969 A | * | 1/1999 | Oki et al. ................. 395/200.3 |
| 5,870,765 A | * | 2/1999 | Bauer et al. ................ 707/203 |
| 5,874,967 A | | 2/1999 | West et al. ................. 345/435 |
| 5,877,741 A | | 3/1999 | Chee et al. ................. 345/113 |
| 5,926,624 A | * | 7/1999 | Katz et al. ............. 395/200.47 |
| 5,936,606 A | | 8/1999 | Lie ............................ 345/113 |
| 5,977,960 A | | 11/1999 | Nally et al. ................. 345/191 |
| 6,005,574 A | | 12/1999 | Herrod ....................... 345/344 |
| 6,006,034 A | | 12/1999 | Heath et al. |
| 6,028,583 A | | 2/2000 | Hamburg .................... 345/112 |
| 6,049,671 A | | 4/2000 | Slivka et al. |
| 6,199,204 B1 | | 3/2001 | Donohue |
| 6,202,207 B1 | | 3/2001 | Donohue |

OTHER PUBLICATIONS

Rosenfeld L B, et al: "Automated Filtering Of Internet Postings" Online, vol. 18, No. 3, May 1994, pp. 27–30, XP000616769 see the whole document.

Yan T W, et al: "Sift—A Tool For Wide–Area Information Dissemination" Usenix Technical Conference, Jan. 16, 1995, pp. 177–186, XP000617276 see the whole document.

Dish Network: "The Integrated Satellite TV Receiver & Digital VHS Recorder System" From JVC and DISH Network. Page 2.

Dish Network: "What America Demands: Lower Cost, More Choice, Greater Value . . . " From JVC/DISH Network Advantage.

"On–The–Fly Program Modification: Systems For Dynamic Updating" by MARK E. SEGAL, OPHIR FRIEDER from IEEE Software, George Mason University. Mar., 1993. Pages 53–65.

User and Installation Guide from JVC. Page 3.

* cited by examiner

SECURE DATA DOWNLOADING, RECOVERY AND UPGRADING

CROSS-REFERENCE TO RELATED APPLICATIONS

This application claims priority of the following applications: application Ser. No. 08/770,238, filed Dec. 20, 1996, in the name of inventors Wei Yen and Steven Weinstein, titled "Internet Multiplexer for Broadcast and Other Information," Provisional Application Serial No. 60/046,749, filed May 12, 1997, in the name of inventors Robert Shaw, Christopher Moeller, Clifford Mercer, Mark Law, and Luis Valente, titled "Operating System and Memory Management."

Each of these applications is hereby incorporated by reference as if fully set forth herein.

BACKGROUND OF THE INVENTION

1. Field of the Invention

The invention relates to secure downloading, recovery and upgrading of data.

2. Description of Related Art

Recent developments in networking include client devices, which interact with a network to contact one or more server devices, and that are disposed for displaying information from those server devices. Division of responsibility among the clients and server allows each client device to use relatively fewer resources (such as processing power or memory) and therefore to be relatively inexpensive. Client devices can be manufactured en masse at relatively smaller cost and distributed to a large number of end users.

One problem in the known art is that client devices are subject to various failures. These can include hardware failures, which can damage software used to control the client device, and software failures, which can cause the client device to operate erroneously. It would therefore be advantageous to provide a method and system for recovery from memory errors in the client device. Moreover, there may be substantial upgrades to software designed for the client device developed after the client device has been manufactured and delivered to the end user. It would therefore be advantageous to provide a method and system for delivering these software upgrades to the client device.

This problem in the known art is exacerbated by several factors. First, as the client device is relatively inexpensive and within the complete physical control of the end user, it is unknown whether the software available at the client device can be trusted. Second, the client device itself cannot necessarily trust the data it receives from the server device it is coupled to if established over an insecure network, such as the internet. Third, the client device has relatively limited resources for communicating with the server device; in particular, the client device has relatively limited resources for rapidly receiving downloaded information from server devices.

Accordingly, it would be desirable to provide an improved method and system for secure downloading, recovery, and upgrading. This advantage is achieved in an embodiment of the invention in which a client device contacts a server device using a reliable software module. The reliable software module obtains trustworthy information with which to perform software and data integrity tests, and with which to locate data for recovery or upgrade of the client device.

SUMMARY OF THE INVENTION

The invention provides an improved method and system for secure downloading, recovery, and upgrading. A client device receives information from a server device using reliable software modules stored in permanent memory in the client device. The reliable software modules perform software and data integrity tests, and locate and retrieve data for recovery or upgrade of the client device. The client device confirms the trustworthiness of the received information device by comparing digital signatures or digests for the information it receives with known digital certificates in the reliable software module or received from known trusted server devices.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, or other special purpose circuits, and that implementation of the preferred process steps and data structures described herein using such equipment would not require undue experimentation or further invention.

System Elements

Figure 1:
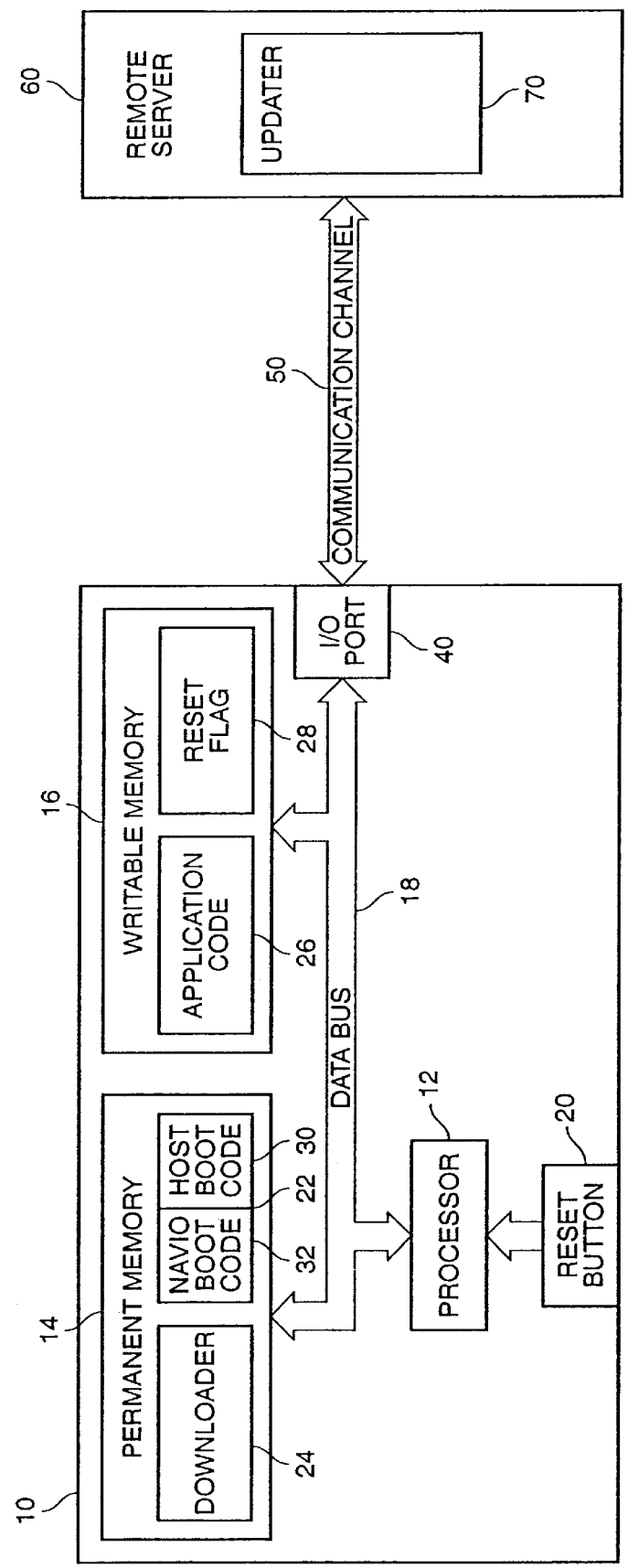
FIG. 1 shows a block diagram of a system for secure data downloading and upgrading.

FIG. 1 shows a block diagram of a preferred embodiment of a system for secure data downloading and upgrading.

A client device 10 has a processor 12 connected to a permanent memory 14 and writeable memory 16 by a data bus 18. Both permanent memory 14 and writeable memory 16 are non-volatile or other persistent memory. Permanent memory 14 is a non-writeable memory, such as a ROM, while the writeable memory 16 is a persistent memory, such as a NVRAM, flash memory or disk. Client device 10 also incorporates other memory, such as RAM into which code is loaded for execution.

Stored within permanent memory 14 is boot code 22, which controls the initialization boot process for client device 10 after a reset or power cycle. Boot code 22 is further subdivided into host boot code 30 and Navio boot code 32. The host boot code 30 is a vendor provided, client-resident code that if present initializes the system after power-on or a reset and then transfers control to the Navio boot code 32. The Navio boot code 32 is the code that is responsible the selection and execution of either the downloader code 24 or the application code 26.

The downloader code 24 is stored within permanent memory 14 and is a secure set of code which controls the connection of client device 10 via I/O port 40 to a communication channel 50. The downloader code 24 is the only copy of code that can be trusted after random or intentional corruption as it resides in permanent read-only storage. I/O port 40 is connected to data bus 18, and permits data such as updater code 70 from a remote server 60 to be downloaded under the control of downloader 24 via communication channel 50 to writeable memory 16 (RAM). Updater code 70 is code that is stored on the remote server 60 and downloaded to the client device 10 to upgrade or recover the application code 26. The application code 26 is stored in writeable memory 16 and is the application seen by the user (i.e. the browser along with the operating system). In order to minimize the size of permanent memory 14 and to maximize flexibility in upgrading application code 26 for client device 10, it is desirable for boot code 22 to be as stream-lined as possible. Additionally, downloader 24 can be compressed in permanent memory 14 to save memory. Later it can be decompressed before being loaded into RAM for execution.

Communication channel 50 comprises a telephone line, ISDN line, cable, fiberoptic, or any other data transfer line connected to a modem or any other network interface device connected to, or contained within, I/O port 40. Such a connection links client device 10 through a network, either a private intranet or the public Internet to any of a plurality of remote servers 60.

Client device 10 includes a forced update feature 20 which when depressed reboots the client device 10. This forced update feature 20 does not need to be a physical switch. It may for example, consist of a combination of switches which when toggled in a specific sequence achieve a reboot and force a download. Alternatively, depressing a reset switch for a predetermined extended period of time, such as for five seconds, could activate the forced update feature 20.

Method of Operation

Figure 2:
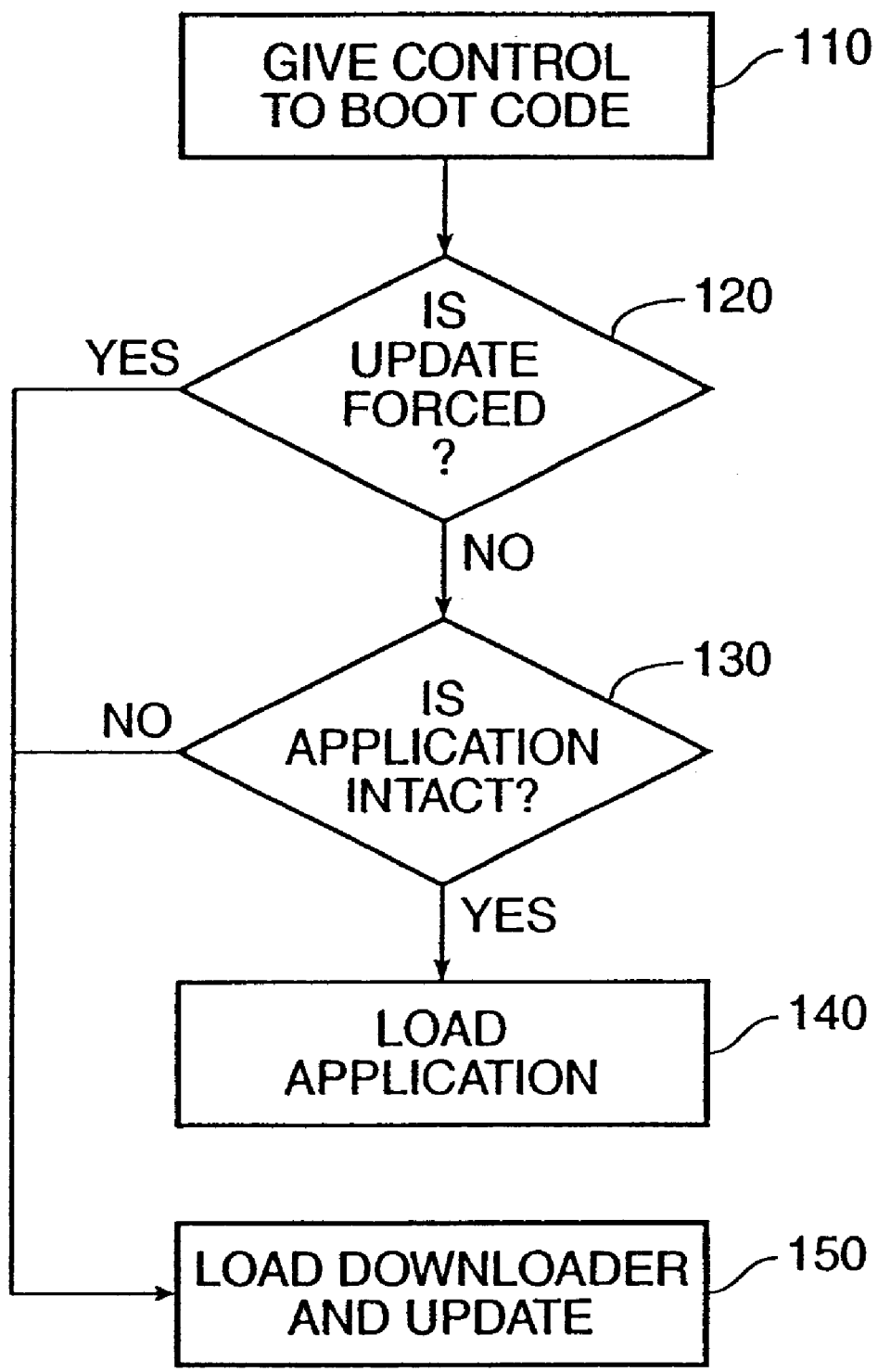
FIG. 2 shows a process flow diagram for booting a client device and determining whether there is a need for downloading and upgrading.

FIG. 2 shows a process flow diagram for booting client device 10 and determining whether there is a need for downloading and upgrading application code 26.

Initially, boot code 22, which is further subdivided into its host boot code and Navio boot code portions, takes control of client device 10. The host boot code 30, a vendor provided, client-resident code initializes the system after power-on or a reset and then transfers control to the Navio boot code 32. After control has been passed to the Navio boot code 32 the decision to run the application code 26 or the downloader 24 is made at step 110. The Navio boot code performs an integrity check on the application code 26 using a verification method such as an MD5 digest because at this part of the process only corruption is being checked as opposed to authenticity.

The writeable memory 16 stores two binary values as indicators of system integrity. The first is RunDownloader which if set causes the downloader 24 to run an upgrade of the application code 26. The second is TrustData which if not set creates the assumption that the data in writeable memory 16 is corrupt despite any appearance to the contrary. This is a validity check to determine whether the writeable memory 16 which contains information like the local ISP phone number and client-id/password as well as application code 26 may be trusted.

When either of these two indicators have these assigned values, a reset flag 28 is set in the writeable memory and the Navio boot code 32 forces a system reboot and update at step 120. Similarly, the user may also press the forced update feature and force a system reboot and update at step 120. In either case once the reboot and update has commenced, the downloader 24 initializes and connects to the remote server 60 and passes the information regarding client-id/password and synchronizes with the remote server 60 at which point the client device 10 may be given a new ISP phone number to call.

At step 130 it is determined whether the application code 26 is intact. If application code 26 is intact, control is transferred to application code 26 at 140 and client device 10 proceeds with its normal function. This is the usual result of the boot sequence. If application code 26 is corrupt, control of client device 10 is transferred to the update downloading sequence 150.

Retrieving the Updater

Figure 3:
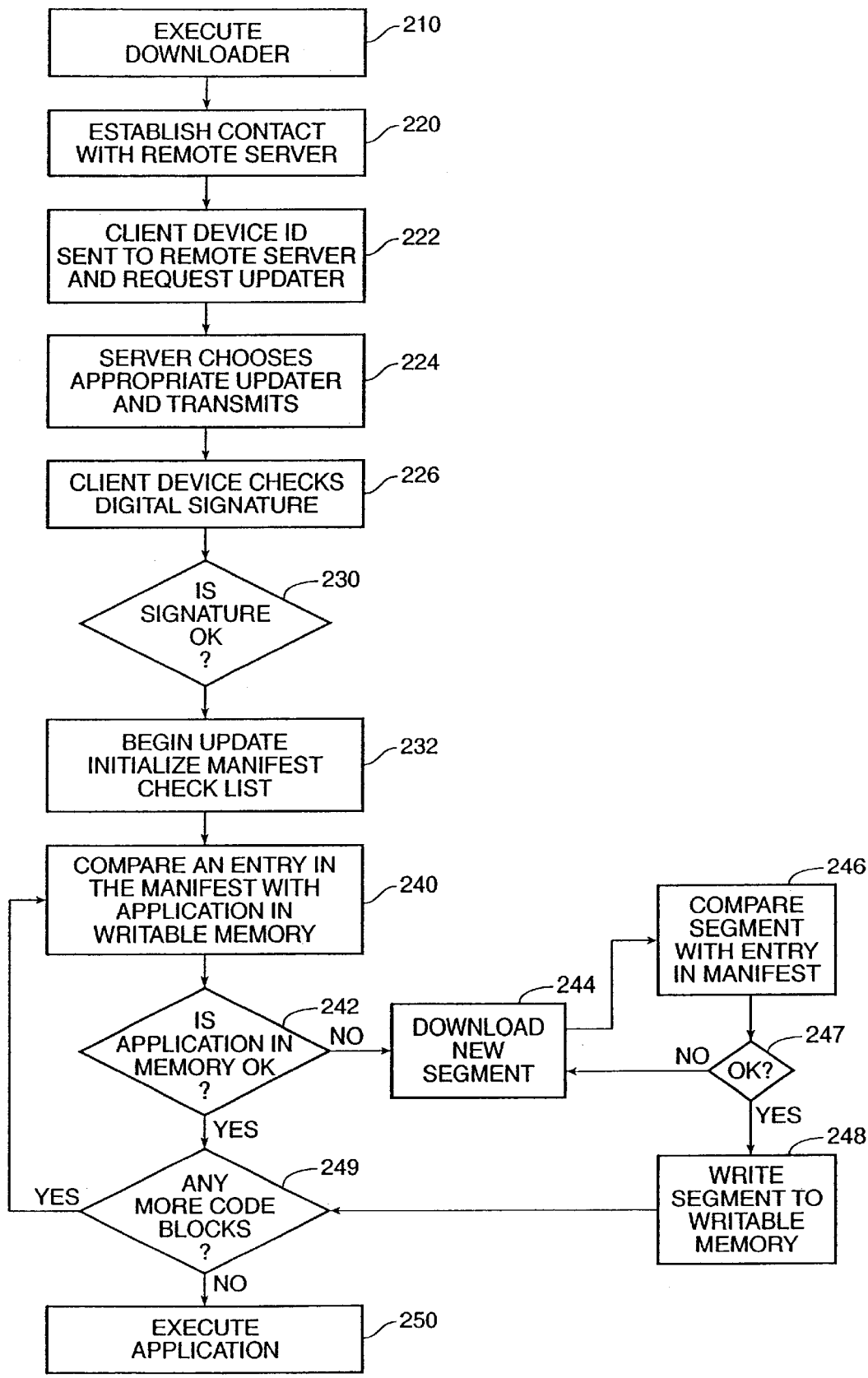
FIG. 3 shows a process flow diagram of a method for secure data downloading and upgrading.

FIG. 2 illustrates the update downloading sequence of the updater 70 from remote server 60 at step 150. FIG. 3 illustrates the updating and downloading sequence in greater detail. Starting at step 210 where the decision has been made to load the downloader, the loading process continues at step 220 with the client device 10 establishing contact with the remote server 60. The client device 10 transmits at step 222 identification information regarding itself, e.g., version number, memory size, and requests transmission of an updater code package, a digitally-signed manifest which in some embodiments may contain additional program code for executing the update.

When the correct updater is located at step 224, a chunk of updater code 70 will be downloaded to the client device from the remote server 60. Next, client device 10 receives the transmitted updater code 70 and checks it at step 226 to determine whether it is valid. In the illustrated embodiment, downloader 24 compares a digital signature or digest contained within the updater package with known signature data saved in downloader code 24. Because downloader 24 is stored in permanent memory 14, it is secure and trustworthy, and hence a match between the digital signature of the updater code package and the stored digital signature validates the identity of the updater. This allows client device 10 to update application code 26 irrespective of the relative security of either communication channel 50 or remote server 60.

Next client device 10 reviews the results of the comparison at step 230. If the signature does not match, the process returns to step 220, preferably with connection to a different remote server 60, and a new updater is received. If the signatures match, the update process begins with an initialization process at step 232. The updater contains a table or manifest, which logically divides application code 26 into smaller code segments, representing portions of or complete logical segments of application code 26.

Retrieving the Application Code

When a valid updater is received the updater is given control of client device 10. It sets the "in update" flag, and loads a new update of code segment by segment. The updater checks each segment of application code 26 for corruption by determining whether the contents of a specific code segment match a hash or digest.

In a preferred embodiment this is implemented by including a manifest or table of secure hashes such as SHA1 in the updater 70. Each hash in the table should correspond to an image of the most recent segment of application code 26. Each hash in the manifest is accompanied by a location identifier, such as an internet URL, for a corresponding replacement code segment. This allows different replacement code segments to be stored in separate locations, such as different remote servers 60. This method allows individual components of application code 26 to be loaded separately.

After the initialization process at step 232, a segment of code from application 26 is verified at step 240 using the hash checklist. As shown at step 242, if that block of code is valid, client device 10 checks at step 249 to see if there are remaining code segments to be verified. If there are more code segments, the process repeats starting at step 240 for the next code segment. If there aren't any more code segments to check, the application is loaded at step 250 and the update is complete.

If the block of code is invalid at step 242, a substitute segment of code is downloaded from the corresponding URL specified by the updater. The downloaded code segment may be encrypted to provide additional security or compressed for transmission to speed download time. After the code segment is downloaded at step 244 and any required decryption or decompression is performed, the new code segment is checked against its respective hash at step 246 and if it matches at step 247 it is then written to writeable memory 16 at step 248 to replace the corrupted segment of application code 26.

Launching the Application Code

When a hash does not correspond to an image of the most recent chunk of application code 26, the updater 70 downloads a file that is designated in the table. At step 246 a check is made to see if there are any more code segments of application code 26 to be checked. After all of the code segments of application code 26 have been checked and validated at steps 242 through 247 and any necessary replacement code segments written to memory at step 248, the application code 26 is completely loaded and ready to execute at step 250.

In a preferred embodiment each file downloaded by the updater 70 is compressed to minimize bandwidth and speed transmission through communication channel 50. In addition, each segment of code downloaded preferably has a default size of no greater than 64 kilobytes to correspond with the size of a sector of flash memory. Additionally, the segments of code to be downloaded should be in ascending order of memory address, non-overlapping and they should not cross a flash sector boundary.

Once a given segment of code is downloaded and decompressed, it is authenticated and validated by using the same hash that was used to check the segment of application code 26 which it is replacing and which originally failed the hash check. If the hash matches that in the table of updater 70 then the downloaded segment of code is authentic and is allowed to overwrite its respective segment of application code 26 in writeable memory 16. This is a means of linking security from the digital signature of the updater to the downloaded segments of code because the authentication happens in the process of downloading. Thus, the digital signature is on the downloaded datastream as well as the updater image in memory.

In a preferred embodiment the table of secure hashes, SHA1 or other equivalents thereof, has a dual purpose. Because the table of secure hashes can check the digest of segments of application code from the updater for validity without checking the whole code segment, a means of compression is achieved in addition to a validity check. For example, a twenty-byte long SHA1 hash can be used to verify a large code segment like a 128-kilobyte segment by skipping the segments that are valid. If only a few segments of code need to be replaced, the savings in transmission time and bandwidth will be substantial. This time savings is important not only to the user of client device 10, but also to the remote server 60 when a large number of client devices 10 need to be updated, such as when a new version of a segment of application code 26 is released or when the number of client devices in service is very large.

Using the process described above, the present invention ensures that a client device 10 can restore a corrupted application code 26 using minimal program code stored in permanent memory 14. Because the validation process occurs each time client device 10 is initialized, the integrity of application code 26 can be maintained on an ongoing basis. Further, because of the use of digitally signed hashes in the updater, secure transmission of only those segments of application code 26 which need to be updated can be achieved using unsecured remote servers 60 and communication channels 50.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A system for updating application code on a client device from a remote server, said system comprising:

a client device further comprising permanent memory and writeable non-volatile memory;

an interface between said client device and a communication channel to the remote server;

software code stored in said permanent memory to perform a boot sequence on said client device, said boot sequence including (a) verifying the validity of application software contained in said writeable memory, (b) automatically retrieving without user intervention from the remote server through said communication channel update data for identifying invalid code segments, (c) automatically retrieving without user intervention from the remote server through said communication channel replacement code for replacement of said invalid code segments, and (d) comparing validity status data within said update data for identifying invalid code segments such that only invalid code segments need be replaced whereby a compression of data transmission is effected; and authentication data stored in said permanent memory for authenticating said update information.

2. The system of claim 1 wherein said system further comprises a forced update switch for generating a reset signal; and wherein said boot sequence further comprises checking for a forced update signal and initiating retrieval of said update data in response to said forced update signal.

3. The system of claim 1 wherein said writeable non-volatile memory further comprises a forced update flag settable in response to software errors or upgrade requests; and wherein said boot sequence further comprises checking said forced update flag and initiating retrieval of said update data in response to said forced update flag.

4. A system as in claim 1 wherein comparing said validity status data within said update data for identifying invalid code segments to be replaced is performed automatically without user intervention.

5. A method of updating application code on a client device from a remote server over a communication channel, said method comprising:

performing a boot sequence under control of boot code stored in permanent memory in said client device, said boot sequence including (a) determining whether to update a software application stored in writeable non-volatile memory, and terminating the boot sequence if no update is necessary, (b) automatically retrieving without user intervention from said remote server over said communication channel update data for identifying invalid code segments, (c) automatically retrieving without user intervention from said remote server over said communication channel replacement code for replacement of said invalid code segments, (d) comparing validity status data within said update data for identifying invalid code segments such that only invalid code segments need be replaced whereby a compression of data transmission is effected, and (e) comparing authentication data within said update data with authentication data stored in said permanent memory for authenticating said update data.

6. The method of claim 5 wherein step (a) further comprises checking for a forced update signal and initiating an update in response to said forced update signal.

7. The method of claim 5 wherein step (a) further comprises checking a forced update flag in said writeable memory and initiating an update in response to said forced update flag.

8. The method of claim 5 wherein step g) comprises determining from validity status data in said update data which code segments of said software application require updating and downloading only those software code segments requiring updating.

9. The method of claim 8 wherein said validity status data comprises hash codes corresponding to discrete logical segments of code within said software application.

10. The method of claim 9 wherein step (f) comprises determining from said validity status data in said update data which code segments of said software application require updating and downloading only those software code segments requiring updating.

11. The method of claim 9 wherein said validity status data comprises hash codes corresponding to discrete logical segments of code within said software application.

12. The method of claim 11 wherein said location data comprises internet addresses corresponding to said discrete logical segments of code.

13. The method of claim 9 wherein said replacement code is encrypted and step f) further comprises decrypting said replacement code.

14. The method of claim 9 wherein said replacement code is compressed and step (f) further comprises decompressing said replacement code.

15. A method as in claim 5 wherein comparing said validity status data within said update data for identifying invalid code segments to be replaced is performed automatically without user intervention.

16. A system for updating application code on a client device from a remote server, said system comprising:

means for providing a permanent memory and a writeable non-volatile memory;

means for interfacing between said client device and a communication channel connected to the remote server;

means for storing software code in said permanent memory including means for performing a boot sequence on said client device, said boot sequence including (a) verifying the validity of application software contained in said writeable memory, (b) automatically retrieving from the remote server without user intervention through said communication channel update data for identifying invalid code segments, (c) automatically retrieving without user intervention from the remote server through said communication channel replacement code for replacement of said invalid code segments, and (d) comparing validity status data within said update data for identifying invalid code segments such that only invalid code segments need be replaced whereby a compression of data is effected; and means for storing authentication data in said permanent memory for authenticating said update information.

17. A system as in claim 16 wherein comparing said validity status data within said update data for identifying invalid code segments to be replaced is performed automatically without user intervention.

* * * * *